July 25, 1939. J. H. HAYES 2,167,335
ARTIFICIAL LURE
Filed April 30, 1937
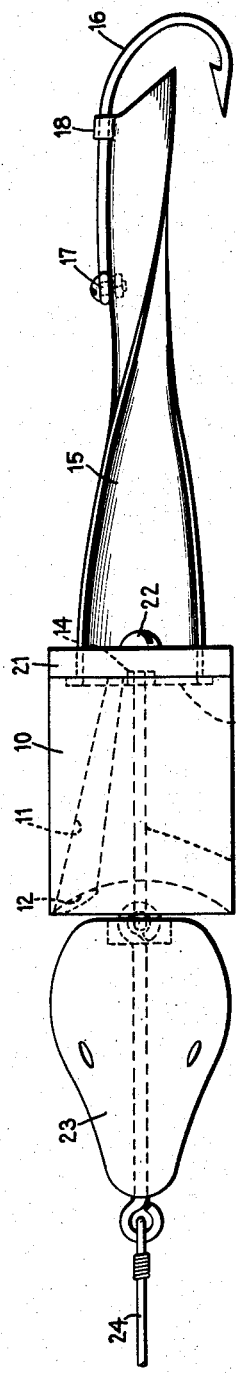
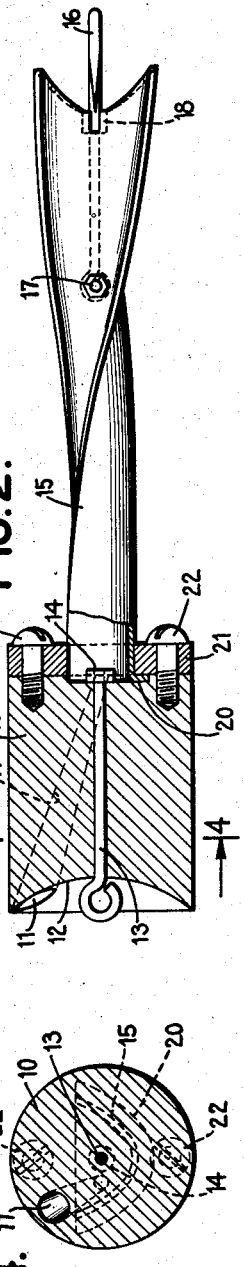
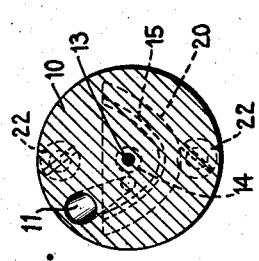
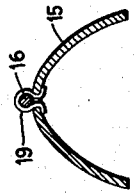
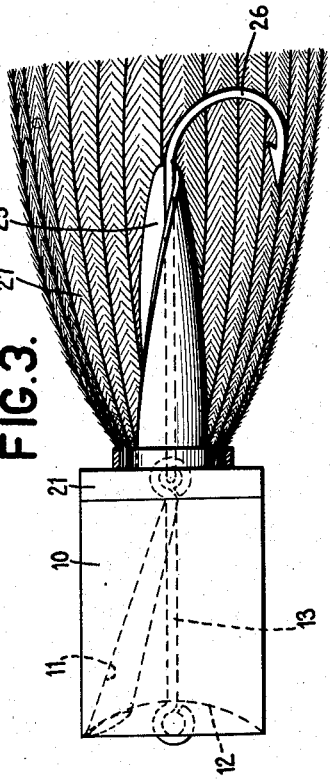
INVENTOR.
JAMES H. HAYES
BY William Lang
his ATTORNEY Patented July 25, 1939

2,167,335

UNITED STATES PATENT OFFICE 2,167,335

ARTIFICIAL LURE

James H. Hayes, New York, N. Y.

Application April 30, 1937, Serial No. 139,862

8 Claims. (Cl. 43—47)

This invention relates to an artificial fish lure and more particularly to an improved lure constructed to effect a movement which will attract fish thereto.

The invention is realized in the provision of a metallic cylinder which is provided with an opening to permit the passage of water therethrough as the cylinder is drawn along at the end of a line. At the end of the cylinder opposite the end to which the line is attached is secured a blade or spoon which in its preferred form is helical.

The opening in the cylinder is so disposed that the water passing therethrough impinges against the blade, causing it to be deflected from a straight line of travel. The combined effect of the spiral blade and the impingement of the water causes the entire device to rotate and at the same time dart from side to side as it is advanced.

At its trailing end, the blade may be provided with a suitably mounted hook and in advance of the cylinder, a simulated head may be connected to enhance the effect of the lure as it darts back and forth.

As a modified form of the invention, the blade may be concealed in a ring of feathers together with the hook.

Various other objects and advantages of the invention will be obvious from the following particular description of one form of mechanism embodying the invention or from an inspection of the accompanying drawing; and the invention also constitutes certain new and useful features of construction and combination of parts hereinafter set forth and claimed.

In the drawing:

Fig. 1 is a view of the entire device assembled.

Fig. 2 is a plan view partly in section.

Fig. 3 is a view of a modified form of the device.

Fig. 4 is a sectional view taken along the lines 4—4 of Fig. 2.

Fig. 5 is a detail view showing a manner of holding the fish hook.

Referring to the drawing, 10 represents the metallic cylinder whose size will vary in accordance with the weight of lure desired. A tapered hole 11 extends from a recess 12 to the opposite end of the cylinder and to the side of the central axis. An axial opening is provided to receive a wire 13 having a head 14 upon which the cylinder may swivel.

The blade 15 has a curved cross-section and is also twisted through ninety degrees as shown, terminating in a fan or fish-tail to which is fastened a hook 16 as by a bolt 17. Projections 18 serve to hold the hook in line with the blade. Another manner of holding the hook may consist of a clip 19 (Fig. 5) which snaps over hook 16 and into the notch in the end of the blade.

The blade 15 has a flange 20 which fits into a suitable recess in the end of the cylinder 10 where it is firmly held by a member 21 and screws 22.

A head 23 is supported in advance of cylinder 10 and configured to allow water to pass into recess 12 and hole 11. Thus, as the device is drawn through the water by line 24, water will be forced through opening 11 and will exert pressure against the blade 15 causing the blade and cylinder to be deflected from a straight line of travel. As the spiral blade will itself turn as it advances, the resulting movement of the device, will carry it through a zig-zag path.

Fig. 3 shows a modified form in which a shorter, twisted, blade 25 is concealed, together with a hook 26 in a ring of feathers 27 which is suitably secured to the member 21. Here also, by virtue of the impinging stream of water, a side to side motion is imparted to the lure as it twirls through the water.

While there has been shown and described and pointed out the fundamental novel features of the invention as applied to two modifications, it will be understood that various omissions and substitutions and changes in the forms and details of the devices illustrated and in their operation may be made by those skilled in the art without departing from the spirit of the invention. It is the intention therefore to be limited only as indicated by the scope of the following claims.

What is claimed is as follows:

1. An artificial fish lure comprising an element, means for drawing the same through the water, said element having an opening therein to receive and discharge water as the element is drawn through the water, and a blade secured to said element adjacent to the discharge end of said opening and intersecting the axis of said opening, whereby as the element and blade are drawn through the water the opening will discharge water against the blade to cause deflection of the element and blade.

2. An artificial fish lure comprising an element, means for drawing the same through the water, a blade secured to said element, said element having an opening therein arranged eccentrically to the axis of the element and at an angle thereto with one end adjacent to said blade, said blade being positioned to intersect the axis of said opening, whereby as the element is drawn along water will pass through said opening and impinge against the blade to cause deflection thereof from a straight line of travel.

3. An artificial fish lure comprising a cylinder, a curved blade extending therefrom, means for drawing the cylinder and blade through the water and an opening through the cylinder, having its axis at an angle to said blade, to direct a stream of water against the blade to deflect the same as it is drawn along.

4. An artificial fish lure comprising a cylinder, a twisted blade extending therefrom, means for drawing the cylinder and blade through the water, and an opening through the cylinder to receive water and discharge the same against the blade whereby as the latter is drawn along it will rotate and at the same time follow a tortuous path.

5. In combination, a cylinder, a blade attached thereto, and extending co-axially therewith, means for drawing the same through the water in the direction of the common axis, and means included in said cylinder for directing a stream of water against said blade at an angle to said axis to cause deflection of the cylinder and blade.

6. In combination, an artificial head, a body member spaced from said head to permit water to pass therebetween and a tail member extending from said body member, said body member having an opening extending therethrough from the space between the body and head to the tail and disposed at an angle to direct a stream of water against the tail member.

7. An artificial lure comprising a body member, a blade extending from said member, feathers surrounding said blade and an opening extending through said body member to direct water against said blade within the feathers as the member is drawn through the water.

8. In combination, an integral device, and means for drawing the same through the water, said device having an extension thereon and an opening therein, said opening being arranged non-parallel to its longitudinal axis to receive water as the device is drawn along and discharge it against said extension of the device at an angle to the longitudinal axis to cause the device to be deflected from a straight line of travel.

JAMES H. HAYES.